Sept. 28, 1965 W. B. SPRING 3,209,182
DYNAMO-ELECTRIC DRIVE ASSEMBLIES
Filed Oct. 19, 1961 4 Sheets-Sheet 1

Inventor
Willard B. Spring
By his Attorney
Carl E. Johnson.

Sept. 28, 1965                W. B. SPRING                3,209,182
                       DYNAMO-ELECTRIC DRIVE ASSEMBLIES
Filed Oct. 19, 1961                                  4 Sheets-Sheet 3
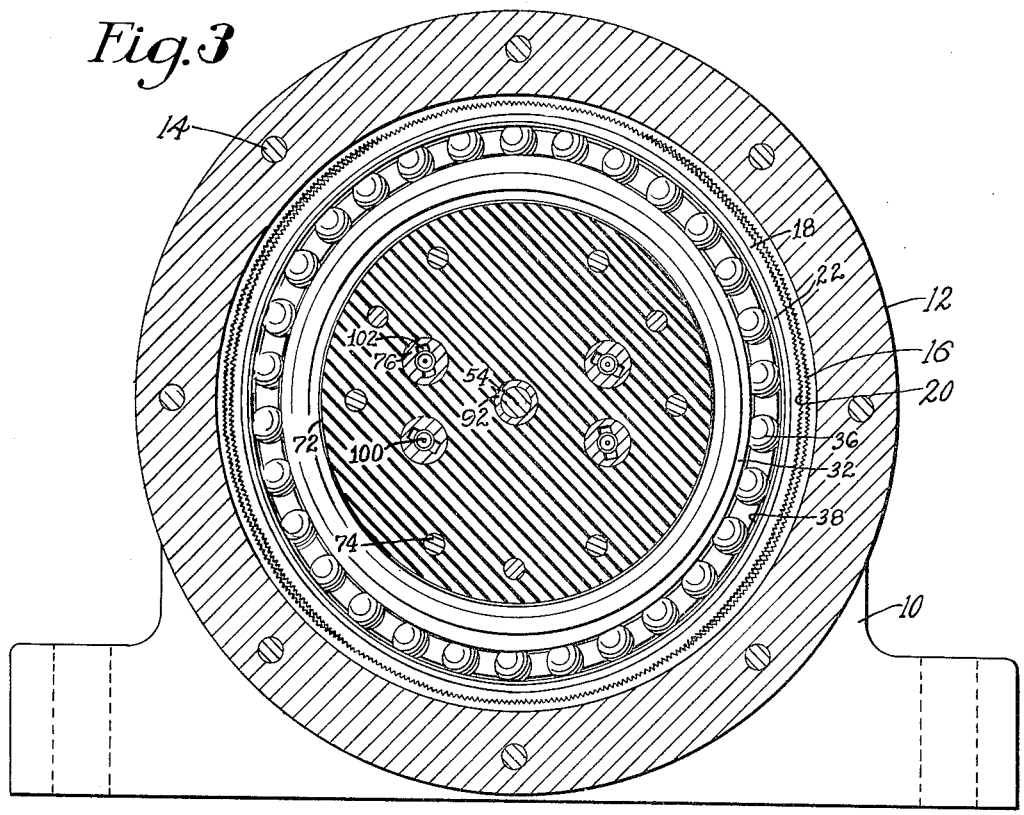
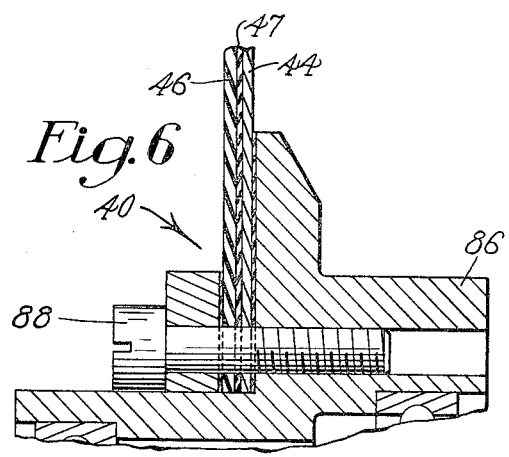

United States Patent Office 3,209,182
Patented Sept. 28, 1965

3,209,182
DYNAMO-ELECTRIC DRIVE ASSEMBLIES
Willard B. Spring, Topsfield, Mass., assignor to United Shoe Machinery Corporation, Boston, Mass., a corporation of New Jersey
Filed Oct. 19, 1961, Ser. No. 146,297
10 Claims. (Cl. 310—83)

This invention relates to dynamo-electric drive mechanism, and more particularly to actuating devices embodying electric induction means including a conductive pattern and a power transmission, for instance of the harmonic drive type, compactly coupled thereto in novel combination.

For an understanding of the general principles involved in harmonic drive mechanisms reference may be had, for instance, to United States Letters Patent No. 2,906,143, issued September 29, 1959, upon an application filed in the name of C. Walton Musser. Basically, these motion transmitting mechanisms comprise a wave generator, a flexible gear, and a ring gear, any one of the elements serving as an input and one or both of the others acting as an output. Hence such drive arrangements may assume many different forms for widely different purposes, their operation being characterized by the propagation of a wave of deflection in the flexible gear causing spaced peripheral engagements between the latter and the ring gear. Hitherto an electric motor has often served as a source of power, its drive shaft normally being adapted to be coupled or gear-connected to the harmonic drive input member. A variant construction, for instance, as disclosed in United States Letters Patent No. 2,943,495, issued July 5, 1960, also in the name of C. Walton Musser, teaches the use of a squirrel cage rotor having an elliptoidally formed hole for imposing a wave of deflection required to transmit rotation.

While harmonic drive is recognized as a versatile form of motion transmitting means, and affords a construction which is fairly compact, precisely responsive to input, and of moderate weight for its power-carrying capacity, the present invention has for its primary object the provision of an electrically actuated transmission mechanism, for example, a harmonic drive, wherein these advantages in particular are further enhanced.

In accordance with the object just stated, a feature of this invention resides in the combination, in an electromechanical converter, with a transmission gearing including a rotary input member, of electric driving means comprising a conductive pattern type actuator within the transmission and attached to the member. Thus, for example, in lieu of providing a motor-reducer unit by means of coupling the respective shafts of a motor and of a harmonic drive type assembly, this invention permits rigid, economical, space-saving construction of a unitary converter by employing a conductive pattern (for instance, a printed circuit) type rotor or armature herein shown in the form of a disk, which may be secured directly to or integral with the input element, for instance a harmonic drive wave generator, no interconnecting means such as a coupling shaft being required. Moreover, as herein illustrated, the novel drive unit may take advantage of the cup-shaped configuration of harmonic drive flex gears, compactly to enclose and protect all or substantially all electric motor parts within a single enclosure. The invention lends itself to providing either D.C. or A.C. drive devices, and is adaptable and applicable to numerous drive systems, such as those types requiring high torque-low speed, precision stepping, or continuous slewing speeds.

The above and other objects of the invention, together with various novel details of construction and combinations of parts, will now be more particularly described in connection with an illustrative dynamo electric drive assembly and with reference to the accompanying drawings thereof, in which:

FIG. 3 is a section taken along the line III—III of FIG. 2, and showing means mounting brush assemblies and harmonic drive elements;

FIG. 6 is an enlarged detail view indicating construction of a printed circuit carrier.

Figure 1:
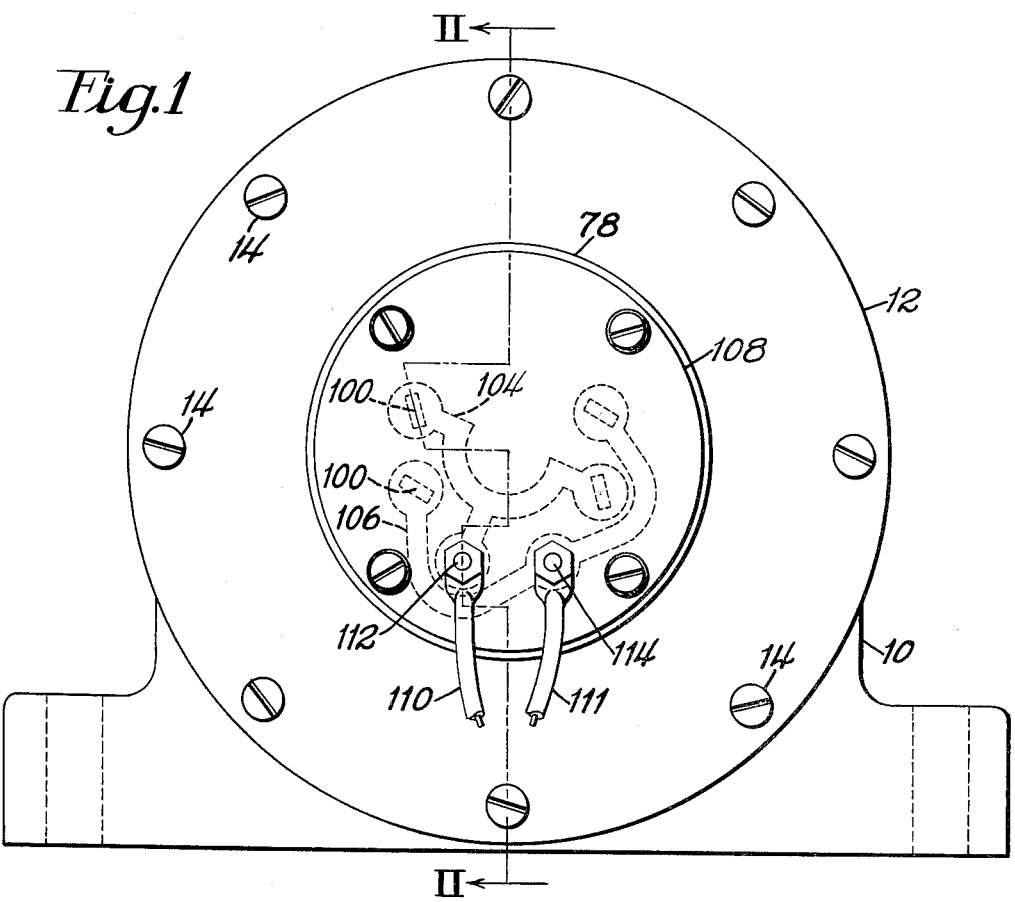
FIG. 1 is a view in end elevation of a D.C. type harmonic drive unit in which the invention is embodied.
Figure 2:
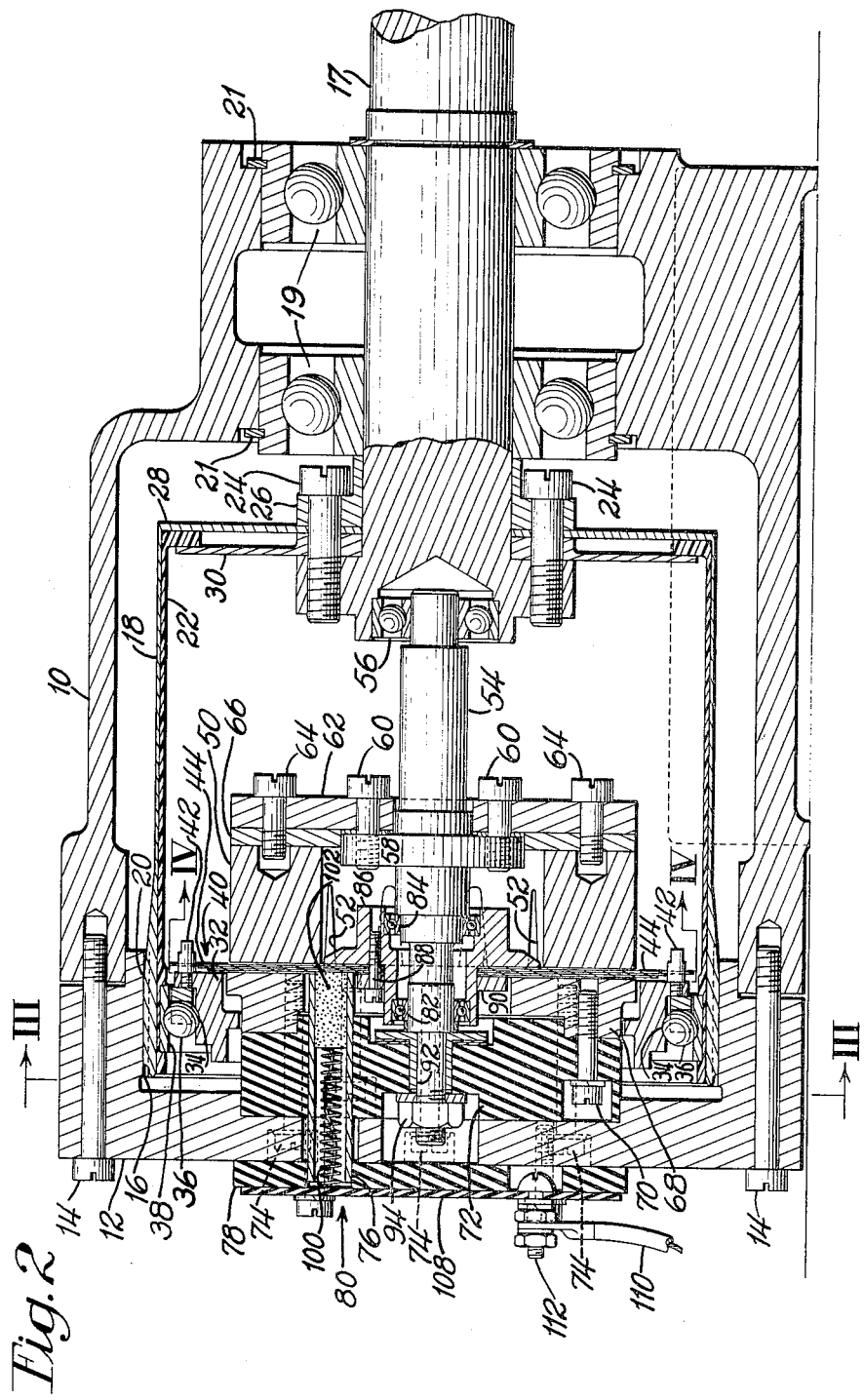
FIG. 2 is an axial vertical section taken on the broken line II—II of FIG. 1, indicating the details of a gearing device in combination with conductive pattern actuating means.

Referring to the motor drive unit illustrated in FIGS. 1 to 3, a stationary housing is comprised of a hollow frame portion 10 (FIG. 2) and an end cover 12 (FIGS. 1 and 2) secured thereto by means of bolts 14. The cover is internally formed with circularly arranged spline teeth 16, but it will be appreciated that these ring gear teeth may, if preferred, be formed on the frame portion. An output shaft 17 is journaled in spaced bearings 19, 19 in an end of the frame portion, the bearings being held against axial movement by means of snap rings 21, 21 (FIG. 2). For transmitting power to the output shaft 17, a generally cup-shaped flextube 18, preferably in this case of composite construction, is provided. At its open end the flextube is externally formed with spline teeth 20 arranged to cooperate with the teeth 16 in the manner disclosed, for instance, in the above cited and other harmonic drive patents (especially those dealing with rotary to rotary versions), the teeth 20 being fewer in number than the teeth 16. As herein shown a plastic cylindrical bearing positioner 22 is mounted within the flextube. For this purpose draw bolts 24 extend through a collar 26 on the shaft 17, through a metallic flanged end portion 28 of the flextube, through a clamping ring 30 engaging the positioner 22, and threadedly engage a flanged inner end of the shaft 17. While the teeth 16 are illustrated on the inside and the flexible teeth 20 are shown on the outside, it will be evident from the cited and other patents relating to harmonic drive that either can be on the inside or outside with cooperating thread-like surfaces or teeth on the adjacent periphery.

By means next to be described a wave generator 32 herein shown as elliptoidal in configuration is rotated about an axis common to the ring gear teeth 16 and to the output shaft. The function of the wave generator is to propagate a continuous rotary deflection wave to produce delative rotation. It will be understood that, in accordance with well-known principles of harmonic drive design, the wave generator may, if desired, be of other construction and/or configuration and may, for instance, have three or more spaced lobes instead of the two-lobe form provided by an elliptoidal shape. As indicated in FIGS. 2 and 3, the elliptoidal generator 32 causes the flextube teeth 20 at the major axis to be most fully engaged, and the teeth 20 at the minor axis to be out of contact and most completely out of engagement. The wave generator is comprised of an inner elliptoidal raceway 34 wherein rolling elements herein shown as balls 36 of uniform size, run. Surrounding these balls is an outer raceway 38 recessed in the positioner 22. As customary in prior harmonic drive construction, although the outer raceway is originally circular, it is deflected into elliptoidal shape imparted by the balls and hence the flextube is correspondingly deflected.

For driving the wave generator, actuating means is attached thereto near the flextube teeth and in the form of a disk-like, laminated rotor or armature generally designated 40 (FIGS. 2 and 6). Thus, pins 42 axially project through radially projecting portions of a thin disk 44 (which may, for instance, be of stainless steel or aluminum) of the rotor 40 and are threaded into diagonally opposite portions of the wave generator. While the construction of the rotor may differ in detail, it is preferably of multi-ply type, in this instance five plies (including the disk 44) being used. Extreme right and left plies shown in FIG. 6 are of small radius for insulating adjacent parts and are nonconductive laminates, for example of the plastic commonly known by the trade name Mylar, a commercially available polyester film. To the left side of the disk 44 as seen in FIGS. 2 and 6 is a non-conductive and stiffening ply 47 (FIG. 6) Mylar for example, and to the left of this is a nonconductive lamina 46 carrying conductive patterns. The laminae are held against relative rotary movement by epoxy cement or other suitable securing means.

Figure 4:
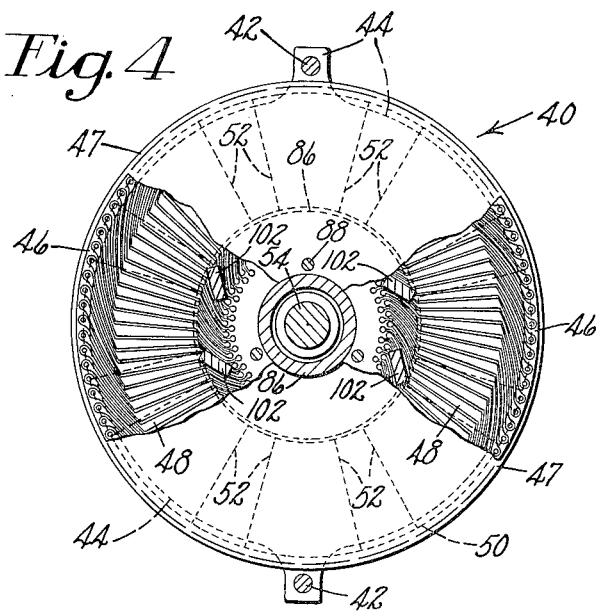
FIG. 4 is a section taken along the line IV—IV of FIG. 2, and showing a composite printed circuit type armature with portions broken away.

While for purposes of illustration this invention is disclosed as embodying the rotor 40 largely as constructed and disclosed in United States Letters Patent No. 2,979,238, granted January 31, 1961, upon an application of R. L. Swiggett, it will be appreciated that in several aspects armature construction for this invention is not necessarily thus limited. The conductive patterns carried by the lamina 46 may be comprised of printed, plated, or etched conductors 48 (FIG. 4) as taught by the Swiggett patent, and when carried on opposite sides or the same side of the lamina, groups of conductors of the armature may be interconnected by suitably located coated apertures as indicated in FIG. 4.

As indicated in FIG. 2, the D.C. converter comprises a multi-pole permanent magnet in the form of an annulus 50, the poles (in this case eight in number) being peripherally spaced by axial slots 52. The annulus 50 is secured on a stationary supporting shaft 54 (FIG. 2) as will next be explained, the shaft being secured at its inner end in a pilot bearing 56 mounted in the output shaft 17. A collar 58 integral with the shaft 54 threadedly receives clamping bolts 60 extending through a plate 62, and the latter receives a plurality of bolts 64 threaded into an adapter 66, the latter being secured by epoxy cement or otherwise to a radial face of the annulus 50. For facilitating the return path of the magnetic flux a ring 68 (FIG. 2) is secured by circularly disposed bolts 70 extending axially through a stationary block 72 preferably of an insulating material, such as phenolic resin. The latter is seated in a recess of the cover 12 and secured thereto by means of bolts 74 the heads of which are recessed in the cover. It will be understood that the wave generator 32 is free, upon current flowing through the rotor conductors 48, to rotate without frictional interference with the ring 68. Four nonconductive sleeves 76 respectively extend axially through bores in the block 72 and an insulating spacer 78 (FIGS. 1 and 2) to house spring-pressed brush assemblies generally designated 80. The conductive pattern type rotor 40 substantially fills the gap between the pole faces of the magnet annulus 50 and of the ring 68. The rotor 40 has a central opening for receiving the shaft 54, and is rotatably mounted thereon by means of spaced bearings 82, 84 journaled in a bearing housing 86 on the shaft 54. This bearing housing is clamped to the inner portion of the rotor by bolts 88 axially extending therethrough and through a retaining ring 90, which surrounds a reduced hub of the housing 86. The shaft 54 incidentally, is held against axial movement by means of a flanged sleeve 92 on the shaft and recessed in one side of the block, and a take-up nut 94 recessed in its opposite side and threaded onto an end of the shaft 54.

For energizing the armature or rotor pattern conductors 48, each brush assembly 80 has a lead 100 (FIG. 2) one end of which is secured to a brush 102 in conventional manner, and the other end of which extends through the spacer 78 for connection to the respective terminals of conductive patterns 104, 106 (FIG. 1) disposed on the inner surface of a nonconductive circular sheet 108 secured even with the spacer 78. As shown in FIG. 1 these circuits are suitably energized by leads 110, 111, respectively extending from a suitable source and connected to their terminal posts 112, 114.

Figure 5:
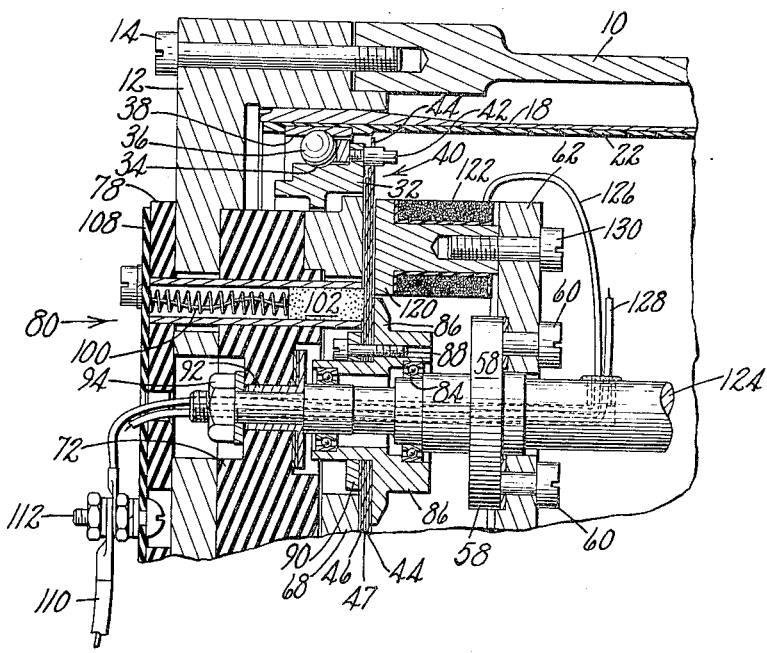
FIG. 5 is a view largely corresponding to a portion of FIG. 2, and showing an alternate form of A.C. or D.C. magnetic field which may be employed in a converter.

FIG. 5 illustrates an electromagnetic drive assembly differing essentially from that shown in FIGS. 1-4 in that, instead of utilizing a permanent magnet annulus 50, a D.C. or A.C. source may be connected to energize a magnetic field comprised of a plurality of circularly disposed cores 120 and their respective coils 122. For this purpose, in lieu of the shaft 54, a similarly mounted, but partly tubular shaft 124 is used as a conduit for leads 126, 128 respectfully connecting the coils 122 (which may be in series) to the terminals 112, 114. In this arrangement the cores are respectively secured to the plate 62 by means of bolts 130 (one only shown), and the ring 68 may be employed to facilitate the return flux paths.

While only a few of the numerous embodiments in which my invention may appear are herein selected to be shown for purposes of convenience in illustration and satisfactory operation, variations and modifications to meet particular need or individual whim will doubtless become evident to others to obtain all or part of the benefits of this invention. Appropriate control circuits, for instance, enable the drive assembly to deliver continuous low speed-high torque, to function as a high torqueing, precision stepper unit with very small steps, and to operate reliably in many other ways, all within the dimensions of the harmonic drive or other type of regular transmission mechanisms.

Having thus described my invention, what I claim as new and desire to secure by Letters Patent of the United States is:

1. An electromagnetic drive assembly comprising a transmission mechanism, a rotary input member, and electric driving means including a conductive pattern carrier in the form of a rotary, disk-like armature which is operatively connected adjacent its outer periphery to the input member, said conductive pattern being disposed in a magnetic field and energizable to actuate the mechanism.

2. An electromagnetic drive assembly comprising a transmission mechanism having input means including a wave generator for propagating a continuous rotary deflection wave in an element of transmission gearing, and electric driving means including a conductive pattern carrier operatively connected adjacent its outer periphery to the input means, said conductive pattern being disposed in a magnetic field and energizable to actuate said mechanism.

3. The drive assembly of claim 2 wherein said driving means is a disk-like armature coupled to the wave generator.

4. The drive assembly of claim 2 wherein the gearing element in which the deflection wave is propagated is a harmonic drive tubular flexspline.

5. A dynamo-electric converter comprising harmonic drive transmission for driving an output shaft, said transmission including a ring gear and a flexible tubular gear one arranged for relative rotation within the other, the teeth of the outer gear being more numerous than those of the inner gear and in mesh with the latter at circumferentially spaced localities and out of mesh at intermediate circumferential localities, the transmission further including coaxial with said gears a wave generator cooperative with the flexible gear for causing relative rotation of the gears, a coaxial conductive pattern type disk-like armature secured near its periphery to one of the ring gear, the flexible gear and the wave generator, and magnetic field means arranged within the transmission for cooperation with said armature whereby energization of the pattern of the latter is effective through the thus secured gear or wave generator to drive the output shaft through one of said gears.

6. A converter according to claim 5 wherein the flexible tubular gear is cup-shaped to house the magnetic field means and operatively connected at its closed end to the output shaft, and the armature is coupled to the wave generator.

7. A converter comprising a stationary housing including an end cover, an output shaft journaled in the housing at an end opposite to said cover, the housing being formed internally with a ring gear, a flexible gear coupled to the output shaft and meshing with the ring gear and arranged coaxially with both of the latter, and means within the housing for rotating the flexible gear with respect to the ring gear, said means including a rotary wave generator having a radial face adjacent to the locality of meshing of said gears, a disk-like conductive pattern carrier secured to said face of the wave generator, means for energizing the conductive pattern of the carrier, and magnetic field means supported by said cover for magnetomotive interaction with the conductive pattern of the carrier.

8. The converter of claim 7 wherein the housing is adapted to support a nonconductive block, said energizing means includes brush assemblies in the block in electrical contact with the conductive pattern at least on one side of the carrier, and a member supported by the housing and having pilot bearing in the output shaft axially extends through the carrier to mount the magnetic field means on opposite sides of the latter.

9. A converter as set forth in claim 8 and wherein said mounting member is tubular, and leads extend through the latter for electrically energizing said field means.

10. An electromagnetic drive assembly comprising transmission mechanism including a pair of coaxial, relatively rotatable gears one of which is radially deflectable into meshing relation at spaced peripheral localities with the other, said mechanism further including a third element in the form of wave generator means coaxial with said gears for effecting said meshing relation, and means for effecting rotation of one of the three transmission elements to drive either of the other two, the last-named means including a circular conductive pattern carrier within the transmission and coupled to said one of the three elements, means for energizing the conductive pattern of the carrier, and a magnetic field energizable to control magnetomotive force exerted by said carrier to rotate said one transmission element.

References Cited by the Examiner

UNITED STATES PATENTS

| | | | |
|---|---|---|---|
| 2,810,844 | 10/57 | Morrill | 310—83 |
| 2,864,017 | 12/58 | Waltscheff | 310—83 |
| 2,906,143 | 9/59 | Musser | 310—83 |
| 3,023,335 | 2/62 | Burr | 310—268 |

OTHER REFERENCES

Harmonic Drive Principles and Performance, Publisher, United Shoe Machinery Corporation, 1959, page 10.

MILTON O. HIRSHFIELD, *Primary Examiner.*